Aug. 17, 1965  M. E. DOWNS ETAL  3,200,914
AUTOMATIC BRAKE DEVICE
Filed Aug. 20, 1962  2 Sheets-Sheet 1
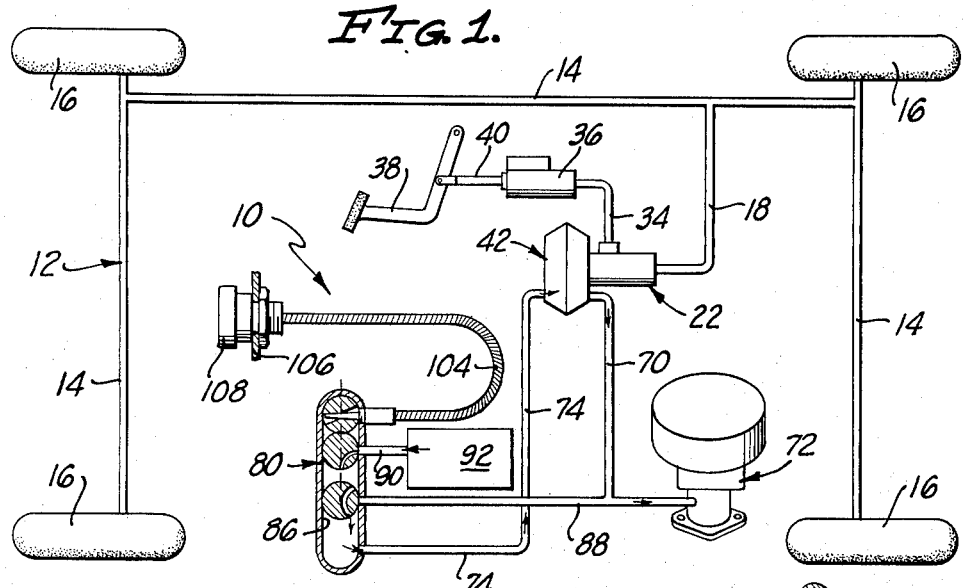
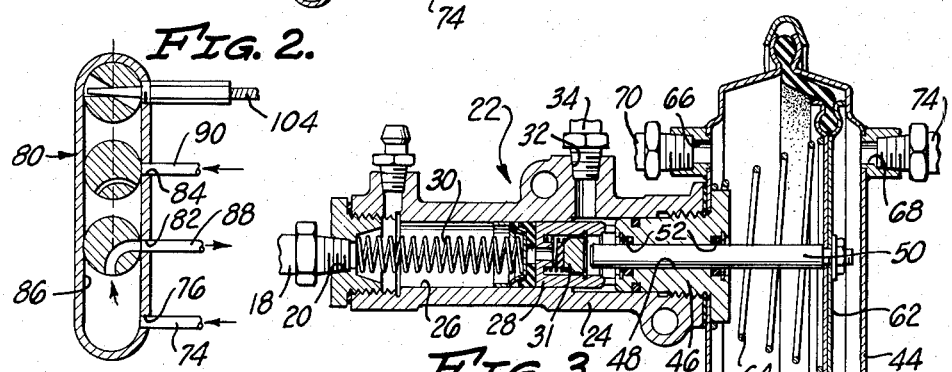
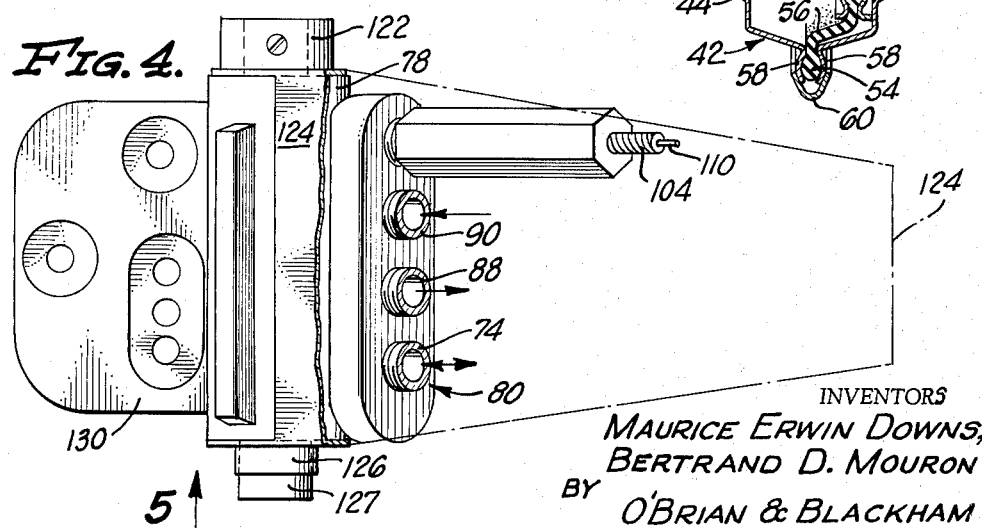
INVENTORS
MAURICE ERWIN DOWNS,
BERTRAND D. MOURON
BY
O'BRIAN & BLACKHAM
ATTORNEYS

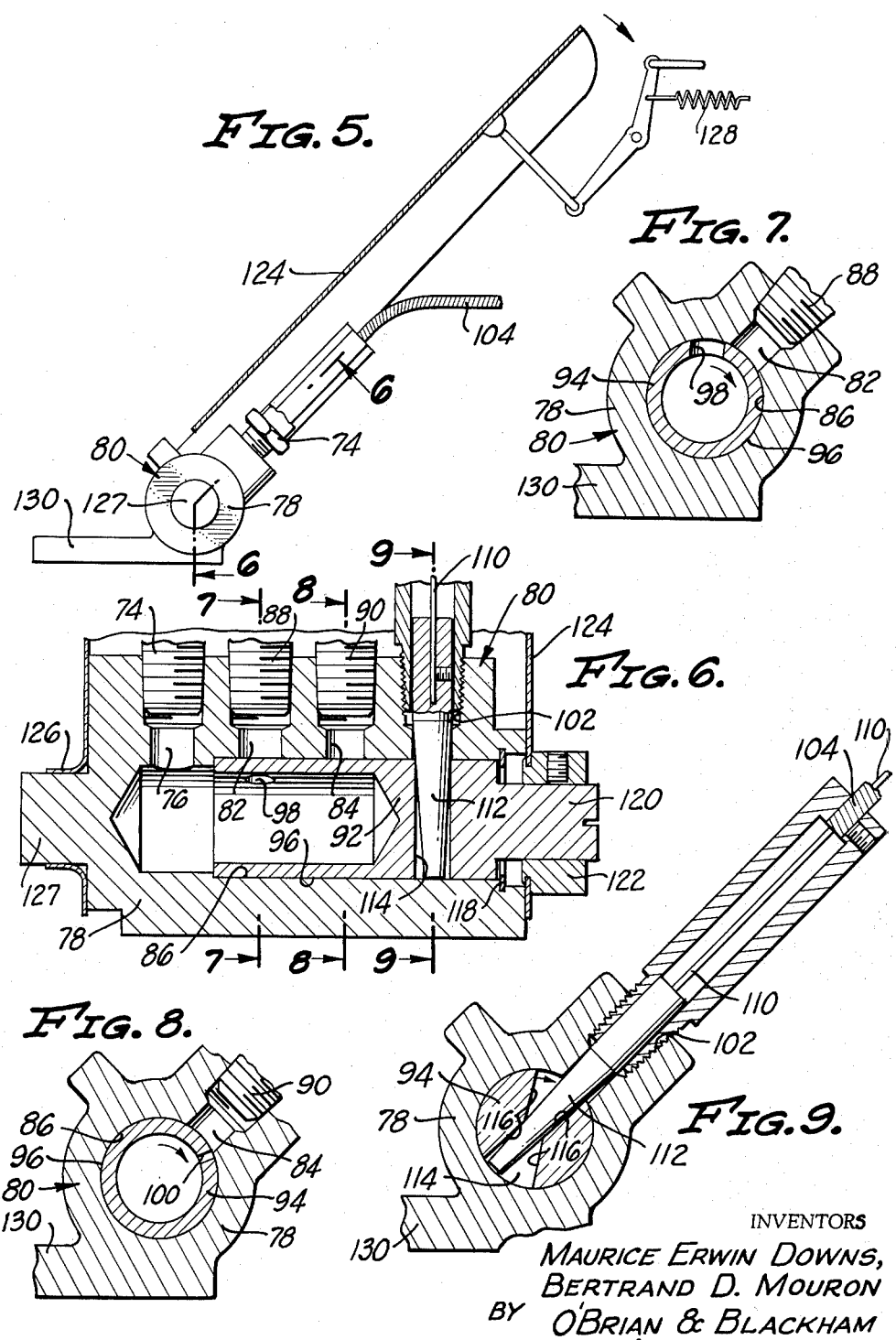

United States Patent Office 3,200,914
Patented Aug. 17, 1965

3,200,914
AUTOMATIC BRAKE DEVICE
Maurice E. Downs, 5963 Gifford Ave., Huntington Park, Calif., and Bertrand D. Mouron, 275 E. 18th St., Corta Mesa, Calif.
Filed Aug. 20, 1962, Ser. No. 217,964
3 Claims. (Cl. 192—3)

This invention pertains to a new and improved automatic brake device. More specifically it pertains to an automatic brake device which is operated in conjunction with the accelerator pedal of a conventional motor vehicle.

It is commonly recognized that the safe operation of a motor vehicle under many different circumstances depends upon the speed with which the brakes of such a vehicle can be applied. It is also commonly recognized that the speed with which a conventional motor vehicle can be applied is in part dependent upon the time it takes the operator of such a vehicle to disengage the accelerator of it and to engage a separate brake pedal. In order to decrease this latter period of time a number of different efforts have been made in order to provide so-called accelerator brake control apparatuses. In general, these prior apparatuses are intended so as to be controlled by movement of the accelerator pedal in a conventional vehicle so as to be actuated automatically when such a pedal is disengaged.

Although prior accelerator brake control devices as are briefly indicated in the preceding paragraph have been built and tested, it is not considered that any of these prior devices adequately meet commercial demands or needs for an automatic brake device which is operated in conjunction with an accelerator pedal of a conventional vehicle for a number of different reasons. One of these reasons pertains to complexity. For an automatic brake control device of the type indicated to be commercially satisfactory its construction must be relatively simple so that the costs of this device are comparatively minimal and so that there are comparatively few operative parts which are apt to malfunction under virtually any circumstance. This latter is more fully explained by referring to reliability. In general, the more parts in an automatic type of device and in general the greater the complexity of these parts, the less the reliability because of possibilities of various parts sticking or not working for other reasons. In the vehicle brake fluid field reliability in operation is, of course, a very prime requisite.

An object of the present invention is to provide new and improved automatic brake devices or brake control devices which overcome many of the limitations and disadvantages of prior related apparatuses as are briefly suggested by the preceding discussion. Another object of the present invention is to provide new and improved automatic brake devices for use in combination with a conventional vehicle having a hydraulic brake system, which devices are comparatively simple in their constructional details, are relatively inexpensive to manufacture and install upon a vehicle, and which are capable of giving very reliable, satisfactory performance over a prolonged period with a minimum of attention. Another object of the present invention is to provide automatic brake devices as indicated in the preceding sentences which can be adjusted so as to achieve a variation in braking rate, depending upon various specific driving requirements.

These and various other objects of this invention as well as many specific advantages of it will be more fully apparent from a detailed consideration of the remainder of this specification including the appended claims and the accompanying drawings in which:

FIG. 1 is a schematic view of a complete automatic brake device of this invention illustrating a valve in this device in a "brake on" position;

FIG. 2 is a schematic view of the valve shown in FIG. 1 in a driving or "brake off" position;

FIG. 3 is a cross-sectional view of a booster or hydraulic power unit employed in the device illustrated in FIG. 1;

FIG. 4 is a top plan view of the valve illustrated schematically in FIGS. 1 and 2 in a "brake on" position, this view showing a part of a foot pedal used in controlling the operation of the vehicle attached to this valve;

FIG. 5 is a side elevational view taken in the direction of the arrow 5 in FIG. 4;

FIG. 6 is a cross-sectional veiw taken at lines 6—6 of FIG. 5;

FIG. 7 is a cross-sectional view taken at line 7—7 of FIG. 6;

FIG. 8 is a cross-sectional view taken at line 8—8 of FIG. 6; and

FIG. 9 is a cross-sectional view taken at line 9—9 of FIG. 6.

The accompanying drawings are primarily intended for explanatory purposes in order to clearly illustrate the nature of a presently preferred embodiment or form of this invention. From a detailed consideration of the remainder of this specification, including the appended claims, in conjunction with the accompanying drawings those skilled in the field to which this invention pertains will realize that various differently appearing parts may be used in a complete automatic brake device of the present invention without departing from the inventive features or principles of this invention as defined or summarized in the appened claims. They will also realize that various changes may be made in the device shown and described through the use or exercise of routine engineering skill or ability without departing from these features or principles.

As an aid to understanding this invention it can be stated in essentially summary from that it concerns automatic braking devices, each of which includes in combination a valve, a means for actuating a hydraulic system in response to a pressure differential and a means for creating a pressure differential in the valve. In a brake device of this invention the valve is provided with a first port which is connected to the means for actuating and with two other ports, one of which is connected to the means for creating a pressure differential. The valve itself is capable of being actuated so as to place either of these two other ports in communication with the first-mentioned port in order to control the operation of the means for actuating. Further, the valve itself is preferably operatively connected to a foot pedal used in governing the motor or other means for propelling a vehicle upon which the hydraulic braking system is employed.

The invention is best more fully described by referring directly to the accompanying drawings. Here there is shown a complete automatic brake control device 10 of the present invention which is used in combination with, and as a part of, a conventional hydraulic brake system 12 of the type utilized on automotive vehicles. This brake system 12 includes an interconnecting hydraulic conduit 14 which terminates in conventional brake cylinders (not shown) located within wheels 16. This entire system 12 is supplied by means of a supply conduit 18 which is connected to the conduit 14 and which is attached to an outlet port 20 of a conventional booster or hydraulic power unit 22.

This booster 22 includes a housing 24 having at one of its extremities a cylinder 26 which is in communication with an outlet port 20. Within the interior of this cylinder 26 there is located a small piston 28 which is normally biased away from the outlet port 20 through the use of a conventional coil spring 30. This piston 28 contains a small check valve 31 of conventional construction. The housing 24 also includes an inlet port 32 which is located at the end of the cylinder 26 remote from the outlet port 20 in such a position that this inlet port 32 cannot be blocked by the piston 28 when the spring 30 moves it as far as possible from the outlet port 20. The inlet port 32 is connected through the use of another conduit 34 to a conventional so-called master cylinder 36 used in conventional brake systems in order to supply hydraulic fluid to a brake system such as the brake system 12. This master cylinder is shown in FIG. 1 of the drawings as being connected to a conventional brake pedal 38 by means of a control rod 40.

One end of the housing 24 is provided with a pressure differential sensing means 42 which includes two half shell-like bodies 44, one of which is carried at its midpoint by what may be termed a plug 46 which in turn is attached to the interior of the cylinder 26 at the extremity of this cylinder remote from the outlet port 20. This plug 46 does not cover the inlet port 32. Within its interior the plug 46 is provided with a cylindrical hole 48 which is aligned with the axis of the cylinder 26, and which in turn carries a rod 50 so that this rod extends from adjacent to the piston 28 to within the interior of the pressure differential sensing means 42. Conventional O-ring seals 52 are located around the periphery of the rod 50 within the plug 46 in order to prevent the movement of either liquid or gas around this rod 50 through the hole 48.

An edged lip 54 on a flexible diaphragm 56 is located between flanges 58 on the mating surfaces of the bodies 44. Preferably a small V-shaped retaining ring 60 of a conventional category is used so as to hold these flanges 58 in contact with the lip 54 so that there is no danger of air escaping between the sides of the diaphragm 56. The center portion of this diaphragm 56 carries a reinforcing plate 62 which in turn is secured to an extremity of the rod 50. Preferably a coil spring 64 is biased between the plug 46 and the plate 62 in order to hold this plate generally away from the cylinder 26, within the plate 62; in this position the rod 50 is, as shown, out of contact with the piston 28. Conventional ports 66 and 68 are located on the bodies 44 as shown so as to be in communication with the opposite sides of the diaphragm 56.

The port 66 is connected by means of a conduit 70 with the carburetor 72 of a conventional internal combustion engine (not shown) when the device 10 is utilized in conjunction with a conventional motor vehicle, in such a manner that during the operation of the engine of this vehicle air is pulled through the conduit 70 in a known manner. The other of these ports 68 is connected by means of another conduit 74 to a first port 76 formed in the housing 78 of a rotary valve 80.

Two other ports 82 and 84 are also formed in this housing 78, so that all of these ports, the ports 76, 82 and 84, lead into the interior of a cylindrical cavity 86 in the housing 78. The port 82 is connected to the conduit 70 by means of a further conduit 88 so that during the operation of the complete device 10 air tends to be pulled from this port 82 by the action of the carburetor 72. The other port 84 is connected to the atmosphere by means of a short tubing section 90. If desired, this tubing section 90 can be connected to a source of air under pressure, although this is not normally necessary. Such a source may be a compressed air tank such as the tank 92 indicated in FIG. 1 of the drawings.

Within the interior of the cavity 86 there is located a valve rotor 94 having a cylindrical wall 96 which fits closely against the interior of the cavity 86 so as to normally cover the ports 82 and 84 in order to prevent the movement of air with respect to these ports. The wall 96 also includes a hole 98 which is adapted to be placed in communication with the port 82 during movement of the rotor 94 as hereinafter described, and another hole 100 which is adapted to be placed in communication with the port 84 during other movement of this rotor 94 as hereinafter described.

The housing 78 also includes a tapped opening 102 which carries an extremity of a conventional, flexible Bowden cable 104, the other extremity of which is mounted upon a conventional dashboard 106, or in another related location. A knob 108 is attached to a flexible wire 110 extending through the center of the cable 104 for use in moving a tapered pin 112 which is connected to the other end of the wire 110 with respect to an opening 114 in the rotor 94 opposite the opening 102. This opening 114 is in the nature of a hole having tapered sides 116 which are adapted to engage the pin 112 in order to limit the movement of the rotor 94. As indicated in the drawings these tapered sides 116 generally extend in a radial manner from the center of the rotor 94.

The rotor 94 is secured with respect to the housing 78 so as to prevent accidental dislodgment of the rotor 94 through the use of a conventional snap ring 118; other equivalent means can be used. The extremity 120 of the rotor 94 which leads past the snap ring 118 is connected by means of a conventional shaft collar 122 to a conventional accelerator pedal 124, and an end 126 of this pedal 124 is rotatably mounted upon a cylindrical extension 127 of the housing 78. This pedal 124 is preferably used in accordance with conventional practice so as to be connected to the carburetor 72 in order to govern the operation of an internal combustion engine of which the carburetor 72 forms a part. Preferably the pedal 124 is biased to a "brake on" position of the device 10 as hereinafter described through the use of a conventional spring 128. A bracket 130 attached to the housing 78 is intended to be used for mounting purposes.

During the operation of this device 10 an engine attached to the carburetor 72 is started and operated in a conventional manner. The valve 80 will be in the configuration indicated schematically in FIG. 1 and as shown in FIGS. 6–9 prior to the pedal 124 being depressed. During such time the carburetor 72 will operate in connection with the valve 80 so that there is a vaccum or reduced air pressure applied to one side of the diaphragm 56 with atmospheric air applied to the other side of this diaphragm. At such times as the pressures on the sides of this diaphragm are unequal the push of the spring 64 will be overcome and the rod 50 will be maintained in a position in which the rod engages the piston 28 so as to operate the brake system 12.

When, however, the foot pedal 124 is depressed this causes the reorientation of the rotor 94 in the valve 80 so that the various parts of it are placed in communication as indicated in FIG. 2 of the drawings in order to move the entire device 10 to a "brake off" position. At this point the carburetor 72 will be connected so as to cause reduced air pressure or vacuum on both sides of the diaphragm 56 through the interior of the valve 80 and the rod 50 will be withdrawn from the piston 28 by the action of the spring 64.

When, however, the pressure is released from the pedal 124 the rotor 94 will be reoriented to a position as indicated in FIGS. 1 and 6–9 of the drawings. This will suddenly allow air at atmospheric pressure to enter the interior of the valve 80 and to be conveyed through the conduit 74 to the port 68 of the means 42. This will create an unbalance of forces within this means 42 which in turn will result in the rod 50 moving so as to contact the piston 28, closing the valve 31, so as move this piston 28 toward the outlet port 20. This will cause the entire brake system 12 to be operated. Upon depression of the pedal 124 this whole sequence of operation is reversed, and the check valve 31 will automatically open. At any time, however, the brake pedal 38 may be operated in a conventional manner. When it is operated the valve 31 is closed, and when the pedal 38 is released, the valve 31 is opened.

The rate at which the braking system 12 operates through the use of the pedal 124 as described in the preceding can be varied depending upon the various factors such as the weight of a specific car, the desires of a driver, or the like through the adjustment of the cable 104. When the knob 108 is pulled away from the cable 104 the pin 112 is partially withdrawn from the interior of the opening 114 in the rotor 94. Because of the particular shape of the sides 116 this in turn permits a greater or lesser degree of movement of the rotor 94, causing a variation in the amount of permissible overlap between the port 84 and the hole 100. This, of course, regulates or adjusts the amount of communication between the interior and the exterior of the valve 80 through the port 84, and this in turn affects the rate at which air can be moved through this port and thence into the means 42.

From a detailed consideration of the foregoing it will be realized that the complete device 10 is a very simple, effective structure for accomplishing its intended purpose. Because of its simplicity this device 10 may be easily and conveniently manufactured at a comparatively nominal cost. Further, it is capable of giving very reliable, satisfactory performance by virtue of the type of construction embodied within it.

Because of the nature of this invention it is to be considered as being limited solely by the appended claims forming a part of this disclosure.

We claim:
1. An automatic brake device for an automotive vehicle which includes:
   vehicle wheels, a hydraulic brake system connected to said wheels to restrain said wheels so as to inhibit rotation of said wheels, means to accelerate said vehicle wheels, said means to accelerate being connected to said wheels and adapted to accelerate said wheels so as to rotate said wheels, said hydraulic brake system including pump means connected to supply hydraulic fluid under pressure to restrain said wheels;
   pump actuating means connected to said pump, said pump actuating means comprising pressure differential sensitive means, said pressure differential sensitive means comprising means defining a space and movable means extending across said defining means so that said movable means divides said space into first and second volumes, said movable means being connected to said pump means so that movement of said movable means in a first direction causes said pump means to supply hydraulic fluid under pressure to said brake system at said wheels, means connected to said movable member to urge said movable member in one direction;
   rotary valve means, said rotary valve means having first, second and third ports, said first port being connected to one of said volumes to control the fluid pressure adjacent one side of said movable means, said second and third ports being connected to fluid supply means under different pressures, a valve spool within said rotary valve means, said valve spool being arranged so that rotation of said valve spool selectively places said second port in communication with said first port and places said third port in communication with said first port;
   said means to accelerate comprising a control pedal, said control pedal being connected to control the acceleration of said wheels, said control pedal being connected to said rotary valve means so as to rotate said rotary valve means and thus control the actuation of said vehicle brake system.

2. The automotive vehicle brake system of claim 1 wherein said movable means is a diaphragm, said first volume being connected to a below atmospheric pressure source of fluid so as to urge said diaphragm in said first direction to cause restraint of said wheels.

3. The automotive vehicle brake system of claim 2 wherein said first port is connected to said below atmospheric pressure source of fluid and said third port is connected to the atmosphere so that fluid pressure in said second volume can be varied between the pressure in said first volume and atmospheric pressure.

References Cited by the Examiner

UNITED STATES PATENTS

| | | | |
|---|---|---|---|
| 723,768 | 3/03 | Whiting | 137—625.24 |
| 781,029 | 1/05 | Spencer et al. | 303—57 |
| 1,829,807 | 11/31 | McMurrin | 91—165 |
| 2,094,135 | 9/37 | Porter | 60—60 X |
| 2,331,790 | 10/43 | Nichols | 91—470 X |
| 2,439,515 | 4/48 | Hodgson | 60—60 X |
| 2,484,139 | 10/49 | Witchger | 60—60 X |
| 2,508,806 | 5/50 | Tann et al. | 60—54.5 |
| 2,654,224 | 10/53 | Price | 60—54.6 |
| 2,921,604 | 1/60 | Zettl | 137—625.43 |
| 2,933,160 | 4/60 | Van Wart et al. | 60—54.6 X |

JULIUS E. WEST, *Primary Examiner.*
ROBERT R. BUNEVICH, *Examiner.*